US 008554021B2

(12) United States Patent
Kletter

(10) Patent No.: US 8,554,021 B2
(45) Date of Patent: Oct. 8, 2013

(54) FINDING SIMILAR CONTENT IN A MIXED COLLECTION OF PRESENTATION AND RICH DOCUMENT CONTENT USING TWO-DIMENSIONAL VISUAL FINGERPRINTS

(75) Inventor: Doron Kletter, San Mateo, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 454 days.

(21) Appl. No.: 12/907,251

(22) Filed: Oct. 19, 2010

(65) Prior Publication Data

US 2012/0093354 A1    Apr. 19, 2012

(51) Int. Cl.
*G06K 9/54* (2006.01)
*G06K 9/00* (2006.01)

(52) U.S. Cl.
USPC .......................................... 382/306; 382/100

(58) Field of Classification Search
USPC ................. 382/306, 100, 173, 181, 190, 217, 382/218, 224
See application file for complete search history.

(56) References Cited

U.S. PATENT DOCUMENTS

| 5,465,303 | A |  | 11/1995 | Levison et al. |
|---|---|---|---|---|
| 5,465,353 | A |  | 11/1995 | Hull et al. |
| 5,491,760 | A |  | 2/1996 | Withgott et al. |
| 5,613,014 | A |  | 3/1997 | Eshera et al. |
| 5,850,476 | A |  | 12/1998 | Chen et al. |
| 5,893,908 | A |  | 4/1999 | Cullen et al. |
| 5,987,171 | A | * | 11/1999 | Wang ............................ 382/173 |
| 6,041,133 | A |  | 3/2000 | Califano et al. |
| 7,283,670 | B2 | * | 10/2007 | Wakeam et al. .............. 382/186 |
| 7,359,532 | B2 |  | 4/2008 | Acharya et al. |
| 7,609,914 | B2 | * | 10/2009 | Hirai ............................. 382/305 |
| 7,672,543 | B2 | * | 3/2010 | Hull et al. ..................... 382/305 |
| 7,844,594 | B1 |  | 11/2010 | Holt et al. |
| 8,086,039 | B2 |  | 12/2011 | Kletter |
| 2006/0104484 | A1 |  | 5/2006 | Bolle et al. |
| 2006/0251339 | A1 |  | 11/2006 | Gokturk et al. |
| 2006/0259524 | A1 |  | 11/2006 | Horton |
| 2006/0285772 | A1 |  | 12/2006 | Hull et al. |
| 2007/0019864 | A1 |  | 1/2007 | Koyama et al. |
| 2007/0022072 | A1 |  | 1/2007 | Kao et al. |
| 2008/0175484 | A1 |  | 7/2008 | Hartmann et al. |
| 2008/0219560 | A1 |  | 9/2008 | Morimoto et al. |
| 2008/0317278 | A1 |  | 12/2008 | Lefebvre et al. |
| 2009/0176566 | A1 |  | 7/2009 | Kelly |
| 2009/0324026 | A1 |  | 12/2009 | Kletter |
| 2009/0324087 | A1 |  | 12/2009 | Kletter |

(Continued)

FOREIGN PATENT DOCUMENTS

EP    1850270 A1    10/2007

OTHER PUBLICATIONS

"Workshare Professional", Mar. 29, 2009, pp. 1-2, http://web.archive.org/web/20090329082245/http://www.workshare.com/products/wsprofe....

(Continued)

*Primary Examiner* — Yon Couso
(74) *Attorney, Agent, or Firm* — Fay Sharpe LLP

(57) ABSTRACT

Visual fingerprinting is used to provide a robust and highly effective method of finding similar content in a large document collection of rich document content composed of multiple text, line-art, and photo image objects. The visual fingerprints capture unique two-dimensional localized aspects of document appearance. The visual fingerprints are highly distinctive; fast for lookup; compact for storage requirements; and scalable to large document collections.

25 Claims, 10 Drawing Sheets

(56) References Cited

U.S. PATENT DOCUMENTS

| | | |
|---|---|---|
| 2009/0324100 A1 | 12/2009 | Kletter |
| 2011/0052015 A1 | 3/2011 | Saund et al. |
| 2011/0173103 A1 | 7/2011 | Batra et al. |
| 2011/0197121 A1 | 8/2011 | Kletter |
| 2012/0093421 A1 | 4/2012 | Kletter |

OTHER PUBLICATIONS

Acrobat Professional, Adobe Systems Inc., Nov. 28, 2009, http://web.archive.org/web/20091128011910/http://www.adobe.com/products/acrobatpro/.

Baumberg, "Reliable Features Matching across Widely Separated Views" In Conference on Computer Vision and Pattern Recognition, vol. 1, pp. 774-781, 2000.

Brown et al., "Invariant Features from Interest Point Groups." In British Machine Vision Conference, BMVC 2002, Cardiff, Wales, pp. 656-665 (here typed as 253-262), Sep 2002.

Carneiro et al., "Multi-Scale Phase-based Local Features" In Conference on Computer Vision and Pattern Recognition, vol. 1, pp. 736-743, 2003.

Compare PDF, AKS Labs, Oct. 12, 2004, http://web.archive.org/web/2004101204134://http://www.compare-pdf.com/.

DIFF PDF, AJD Software, Jan. 24, 2006; http://www.supershareware.com/diff-pdf-free/software/.

Eddins, Steve, "Intensity-Weighted Centroids", The Mathworks, Aug. 31, 2007, pp. 1-4, http://blogs.mathworks.com/steve/2007/08/31/itensity-weighted-centroids.

Florack et al., "General intensity transformations and differential invariants," In Journal of Mathematical Imaging and Vision, vol. 4, No. 2, pp. 171-187, May 1994.

Freeman et al., "The Design and Use of Steerable Filters" Transactions on Pattern Analysis and Machine Intelligence, vol. 13, pp. 891-906, 1991.

Harris et al., "A Combined Corner and Edge Detector." Proceedings of the Alvey Vision Conference, pp. 147-151, 1988.

Iwamura et al., Improvement of Retrieval Speed and Required Amount of Memory for Geometric Hashing by Combining Local Invariants, Osaka Prefecture University, Japan, 10 pages, Proc. BMVC2007 (Sep. 2007).

Kadir et al., "An Affine Invariant Salient Region Detector." Computer Vision—ECCV 2 004, pp. 228-241.

Kletter, Detection of duplicate document content using two-dimensional visual fingerprinting, U.S. Appl. No. 12/907,226, filed Oct. 19, 2010.

Nakai et al., Camera-Based Document Image Retrieval as Voting for Partial Signatures of Projective Invariants, Graduate School of Engineering, Osaka Prefecture University, Japan, Proceedings of the 2005 Eight International Conference on Document Analysis and Recognition (ICDAR'05) 2005 IEEE, 5 pages.

Learn Acrobat 9—Comparing two PDF documents / Adobe TV, Dec. 20, 2009, pp. 1-8, http://web.archive.org/web/20091220080445/http://tv.adobe.com/watch/learn/~acrobat-9/co....

Ledwich et al., "Reduced SIFT Features for Image Retrieval and Indoor Localization." IEEE Transaction on Pattern Analysis and Machine Intelligence, vol. 19, No. 5, May 1997.

Lepetit et al., "Randomized Trees for Keypoint Recognition." Proceedings IEEE Computer Society Conference on Computer Vision and Pattern Recognition CVPR05, vol. 2, pp. 775-781, 2005.

Lepetit et al., "Keypoint recognition using randomized trees", IEEE-PAMI, vol. 28, No. 9, pp. 1465-1479,Sep. 2006.

Lepetit et al., "Point Matching as a Classification Problem for Fast and Robust Object Pose Estimation." In Conference on Computer Vision, pp. 128-142, Copenhagen, 2002.

Lepetit et al., "Towards Regognizing Feature Points using Classification Trees." Technical Report IC/2004/74 EPFL, 2004.

Lindeberg et al., "Feature Detection with Automatic Scale Selection." International Journal of Computer Vision, vol. 30, No. 2, pp. 79-116, 1998.

Lowe, "Distinctive Image Features from Scale-Invariant Keypoints." International Journal of Computer Vision, vol. 60, No. 2, pp. 91-110, 2004.

Mikolajczyk et al., "A performance Evaluation of Local Descriptors." In Conference on Computer Vision and Pattern Recognition, pp. 257-263, Jun. 2003, (paper shows a draft date of Feb. 23, 2005).

Mikolajczyk et al., "An Affine Invariant Interest Point Detector." In European Conference on Computer Vision and Pattern Recognition, vol. 1, pp. 128-142, 2002.

Nakai et al., Hashing with Local Combinations of Feature Points and Its Application to Camera-Based Document Image Retrieval—Retrieval in 0.14 Second from 10,000 Pages-, Graduate School of Engineering, Osaka Prefecture University, Japan, pp. 87-94, Proc. First International Workshop on Camera-Based Document Analysis and Recognition (CBDAR2005), pp. 87-94 (Aug. 2005).

Nakai et al., Use of Affine Invariants in Locally Likely Arrangement Hashing for Camera-Based Document Image Retrieval, Graduate School of Engineering, Osaka Prefecture University, Japan, pp. 1-12, Lecture Notes in Computer Science (7th International Workshop DAS2006), 3872, pp. 541-552 (Feb. 2006).

Neuwirth et al., "Flexible Diff-ing in a collaborative Writing System," Carnegie Mellon University, Pittsburgh, PA 15213, CSCW 92 Proceedings Nov., pp. 147-154.

Nuance, Comparing PDF Documents, 2002-2010 Nuance Communications, Inc., Jul. 7, 2009, pp. 1-2.

Pilet et al., "Fast Non-Rigid Surface Detection, Registration and Realistic Augmentation." International Journal of Computer Vision, Springer 2007.

Schaffalitzky et al., "Multi-View Matching for Unordered Image Sets or How do I Organize my Holiday Snaps" in European Conference on Computer Vision, vol. 1, pp. 414-431, 2002.

Schmid et al., "Local Greyvalue Invariants for Image Retrieval." IEEE Transaction on Pattern Analysis and Machine Intelligence, vol. 19, No. 5, May 1997.

VAIBHAC, Compare Documents Side-By-Side in Excel and Word, Apr. 9, 2008, pp. 1-2.

Viola et al., "Rapid object detection using a boosted cascade of simple features." In Proceedings of Computer Vision and Pattern Recognition CVPR, vol. I, pp. 511-518, 2001.

Workshare Professional, WorkShare Inc., Apr. 15, 2005, http://web.archive.org/web/20050415102858/http://www.workshare.com/products/wsprofessional/.

Yan Ke et al., "PCA-SIFT: A More Distinctive Representation for Local Image Descriptors." In Conference on Computer Vision and Pattern Recognition, pp. 111-119, 2000.

"AJC Diff", Jun. 19, 2008, http://web.archive.org/web/20080619081259/http://www.ajcsoft.com/ProductsAJCDiff.php.

"Business Collaboration", Jan. 16, 2008, pp. 1-2, http://web.archive.org/web/2008/0116032852/http://web.exostar.com/solutions/collaborati....

Eisenberg, A. "The Magnifying Glass Gets an Electronic Twist". May 25, 2008, http://www.nytimes.com/2008/05/25/technology/25novel.html?r=3&ref=technology&oref=slogin &oref=slogin &oref=slogin 2 pages.

Gengembre et al., "The Orange Labs Real Time Video Copy Detection System—TrecVid 2008 Results", Oct. 27, 2008, retrieved from the Internet: http://www-nlpir.nist.gov/projects/tvpubs/tv8.papers/orangelabs.pdf (retrieved on Feb. 22, 2013).

Potthast et al., "Cross-Language Plagiarism Detection, Language Resources and Evaluation", Springer Netherlands, Dordrecht, vol. 45, No. 1, Jan. 30, 2010, pp. 45-62.

Ramachandrula et al., "PaperDiff: A Script Independent Automatic Method for Finding the Text Differences Between Two Document Images", Document Analysis Systems, 2008; DAS '08, the 8th IAPR Int'l Workshop ON, IEEE, Piscataway, NJ, US, Sep. 16, 2008, pp. 585, 590.

Lorenz et al., "Automatic Indexing for Storage and Retrieval of Line Drawings", Int'l Society for Optical Eng'g, US, vol. 2420, Feb. 9, 1995, pp. 216-227.

EP Search Report, corresponding EP Appl. No. 11184541.8, Mailed Mar. 1, 2013, Completed Feb. 22, 2013, The Hague.

GW Micro-Catalog-Magnifiers—Portable SenseView Duo. https://www.gwmicro.com/Cataloq/Magnifiers/?moreInfo=8131-001-Duo, Retrieved Sep. 2, 2009, pp. 1.

GW Micro-Catalog-Magnifiers—Portable SenseView P430. https://www.gwmicro.com/Cataloq/Magnifiers/?moreInfo=8131-001, Retrieved Sep. 2, 2009, pp. 1.

QuickLook Classic. http://www.freedomvision.net/1%20QuickLook%20Basic.html, Sep. 5, 2008, pp. 1-3.

QuickLook Focus. http://www.freedomvision.net/1%20QuickLook%20Focus.html, May 27, 2008, pp. 1-3.

QuickLook . http://www.freedomvision.net/1%20QuickLook.html, Feb. 1, 2009, pp. 1-2.

* cited by examiner

FINDING SIMILAR CONTENT IN A MIXED COLLECTION OF PRESENTATION AND RICH DOCUMENT CONTENT USING TWO-DIMENSIONAL VISUAL FINGERPRINTS

BACKGROUND

This application is directed to finding document content in a large mixed-type document collection containing rich document content using two-dimensional (2D) visual fingerprints.

Modern rich document content applications such as Microsoft Word and PowerPoint incorporate different object types that can be individually manipulated. A rich content page may be composed of the plurality of different objects such as text, line-art, and photograph content, for example. These rich document content applications usually provide a convenient set of tools for accessing individual objects and for editing and re-positioning content relative to other objects on the page.

The reuse of previous document material through cut and paste and repositioning of objects on the page is a widespread common practice in creating rich presentations content with applications such as Microsoft PowerPoint and page layout programs.

This object identity, however, is lost when objects are rendered to produce a series of page images for visual two-dimensional fingerprinting. When rendering page objects for such two-dimensional fingerprinting, the entire page content is "flattened" first to form an image, which is then fingerprinted by computing visual fingerprints from local geometry or image appearance properties. In consequence, some of the resulting fingerprints may "bind together" local properties of different types of objects that happen to reside in close local proximity.

For example, consider a page composed of a photo image and a closely placed text caption directly below. A visual fingerprint near the bottom boundary of the image may involve a local neighborhood whose upper portion contains a part of the photo, and lower portion contains part of the caption text. Thus the resulting fingerprint is likely to mix together (a) photo properties with (b) text properties in its appearance.

The problem with hybrid mixed-content visual fingerprints is that they are rather unforgiving to minor local changes such as a user selecting and moving a text caption object closer or further away from an associated photo object. The resulting mixed-content fingerprints of a modified page are likely to be different than the original fingerprints due to the resulting change in local appearance. The mixed-content fingerprints require the precise visual alignment between unrelated object types.

The hybrid mixed-content fingerprint behavior is at odds with the user expectation, which is that unless there is a substantial change, a user is still likely to think of a modified page with a slightly different distance between a photo and a text caption objects as being composed of essentially the same content.

Therefore unless the content being sought is purely identical, hybrid mixed-content in rich documents should be avoided when employing existing two-dimensional visual fingerprinting. The disclosure of the present application addresses this issue, disclosing a method and system which provides for the detection of hybrid mixed rich content.

INCORPORATION BY REFERENCE

U.S. patent application Ser. No. 12/147,624 (20080166-US-NP), titled: METHOD AND SYSTEM FOR FINDING A DOCUMENT IMAGE IN A DOCUMENT COLLECTION USING LOCALIZED TWO-DIMENSIONAL VISUAL FINGERPRINTS, by, Kletter, Saund, Janssen, and Atkinson.

U.S. patent application Ser. No. 12/147,867 (20080302-US-NP), titled: SYSTEM AND METHOD FOR FINDING STABLE KEYPOINTS IN A PICTURE IMAGE USING LOCALIZED SCALE SPACE PROPERTIES by Kletter.

U.S. patent application Ser. No. 12/163,186 (20080303-US-NP), titled: METHOD FOR FINDING A PICTURE IMAGE IN AN IMAGE COLLECTION USING LOCALIZED TWO-DIMENSIONAL VISUAL FINGERPRINTS, by Kletter.

U.S. patent application Ser. No. 12/907,226 (20100094-US-NP), titled: DETECTION OF DUPLICATE DOCUMENT CONTENT USING TWO-DIMENSIONAL VISUAL FINGERPRINTING, by Kletter.

BRIEF DESCRIPTION

Two-dimensional visual fingerprinting is used to provide a robust and highly effective method of finding similar content in a large document collection of rich document content composed of multiple text, line-art, and photo image objects. The visual fingerprints capture unique two-dimensional localized aspects of document appearance. The visual fingerprints are highly distinctive; fast for lookup; compact for storage requirements; and scalable to large document collections.

DETAILED DESCRIPTION

Figure 1:
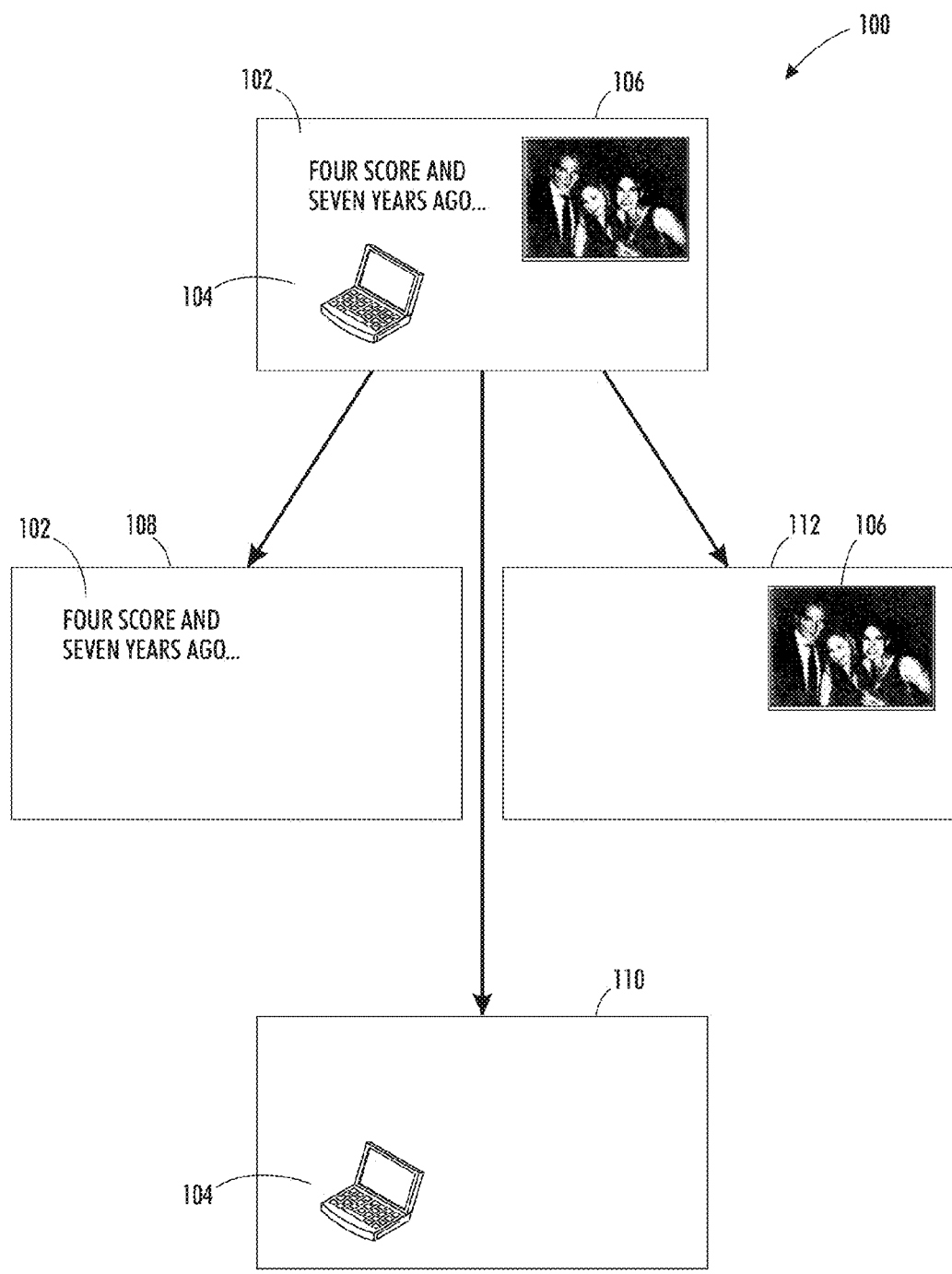
FIG. 1 illustrates a rich content document page and separated layers of that page.

The following discloses a method and system for finding similar content in a document collection containing rich content document image pages, such as document image page 100 of FIG. 1 having mixed types of objects such as text 102, line-art 104, and photos 106, whereby formation of hybrid mixed-content fingerprints are avoided. From the above, it is to be understood that a rich document image page is a document page having more than a single data type on the page.

This system and method uses a classifier to automatically classify features such as, but not limited to, text, line-art and photo object types based on local image properties. The classifier output is applied to separate the image content into multiple image layers based on category type of the objects. By fingerprinting each image layer independently and tagging the resulting visual fingerprints by category type, the creation of hybrid mixed-content fingerprints is avoided.

Instead of "flattening" the document image page content to a single image layer during visual fingerprinting, this method and system creates multiple image layers, each corresponding to a different object category. For example, as further shown in FIG. 1, where three image layers 108, 110 and 112 corresponding to three object category types: text 102, line-art 104, and photos 106, which are the most common object categories. It is however, understood that additional categories (e.g., high-lighted objects, handwritten annotations, etc.) may be added in alternative embodiments. Likewise, the image areas of the layers 108, 110, 112 are conceptually shown to occupy the entire original image area 100, although the size of each image layer may in practice be individually trimmed to the actual layer area of content without having to store unnecessary pixel value outside of the actual layer area.

Each layer of the multiple image layers (representing separate object categories) is individually fingerprinted. By separating the text, line-art, and photo object information into independent image layers the resulting visual fingerprints will remain true to category type and prevent the local "mixing" of information across different category types. Each visual fingerprint uniquely captures the pure local appearance of a corresponding category without being contaminated by the other categories.

If the rendering engine can access page objects by type, then in those embodiments it is possible to obtain the perfect assignment of each individual image pixel by category type. A PostScript or PDF render, for example, may be able to produce pixel-based rendering hints where each pixel is individually tagged as being either a text or an image pixel.

Figure 2:
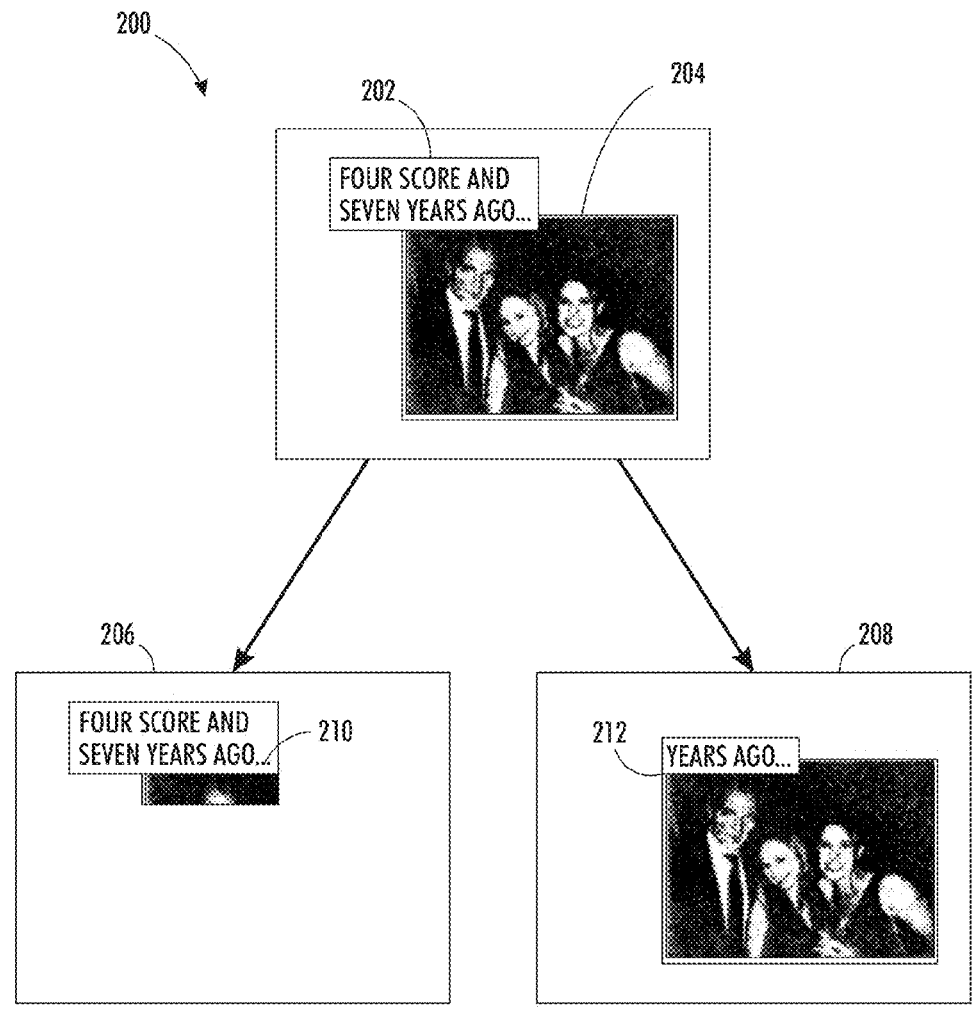
FIG. 2 illustrates a rich document page and separated layers with overlap between different object types.

However, in the general case, the assignment of pixels to category types may be unknown or difficult to obtain. Depending on the application, the various page content objects may be in a proprietary inaccessible form. In addition, different types of objects may be blended together or intermingled during the rendering operation, so it is not possible to determine the resulting category. For example, as shown in document image page 200 of FIG. 2 a text object 202 may be placed over a photo object 204 and blended with it, whereby the resulting blended pixels are neither text nor image. This is shown in image layer In this disclosure a classifier is used for the purpose of separating the "flattened" image into multiple image layers and assigning image pixels to category types. An aspect of this system and method is that it can be universally applied to any document type regardless of the format and details of internal representation.

The classifier analyzes local image properties in the "flattened" image layer in order to identify and label the type of content as a particular object type (e.g., text, line-art, or photographic content). In the context of this application, the most fitting object label is applied (classified) based on local image properties. In embodiments the classification is not required to be mutually exclusive. In case of a significant ambiguity between two object category labels (e.g., text and photo) the method and system may choose to declare both labels, independently compute text and photo fingerprints, and match either set in turn with the query image fingerprints. The overlap situation is depicted in image layers 206 and 208 of FIG. 2 where pixel areas of ambiguity 210, 212 are presented in both layers. The final decision of what object the areas of ambiguity should be classified into can be determined by weighting the returned results. Other types of blending commonly occur when transparency is involved, such as when a partially transparent object is placed on top of previously rendered objects to create a "see through" effect. For example, when semi-transparent text is overlaid on top of a photo image, the resulting pixel colors of the text object on the page are comprised of weighted blended values between the text colors and the underlying photo colors, which cannot be uniquely labeled as belonging to either pure "text" or pure "photo".

The distinction between text, line-art, or photographic content is based on the attributes of each type of object. Text objects are characterized by high contrast, sharp edge transitions between two colors, the foreground (text color) and background (fill color). Either the foreground or background color may be transparent.

Natural photo image objects, on the other hand, are commonly characterized by smooth color gradations, variable contrast and edge information, as well as variable texture.

Computer generated line-art and business graphics objects such as clip-art, drawings and company logos tend to have a multi-modal color distribution with higher edge contrast and sharpness than natural photo images.

Figure 3:
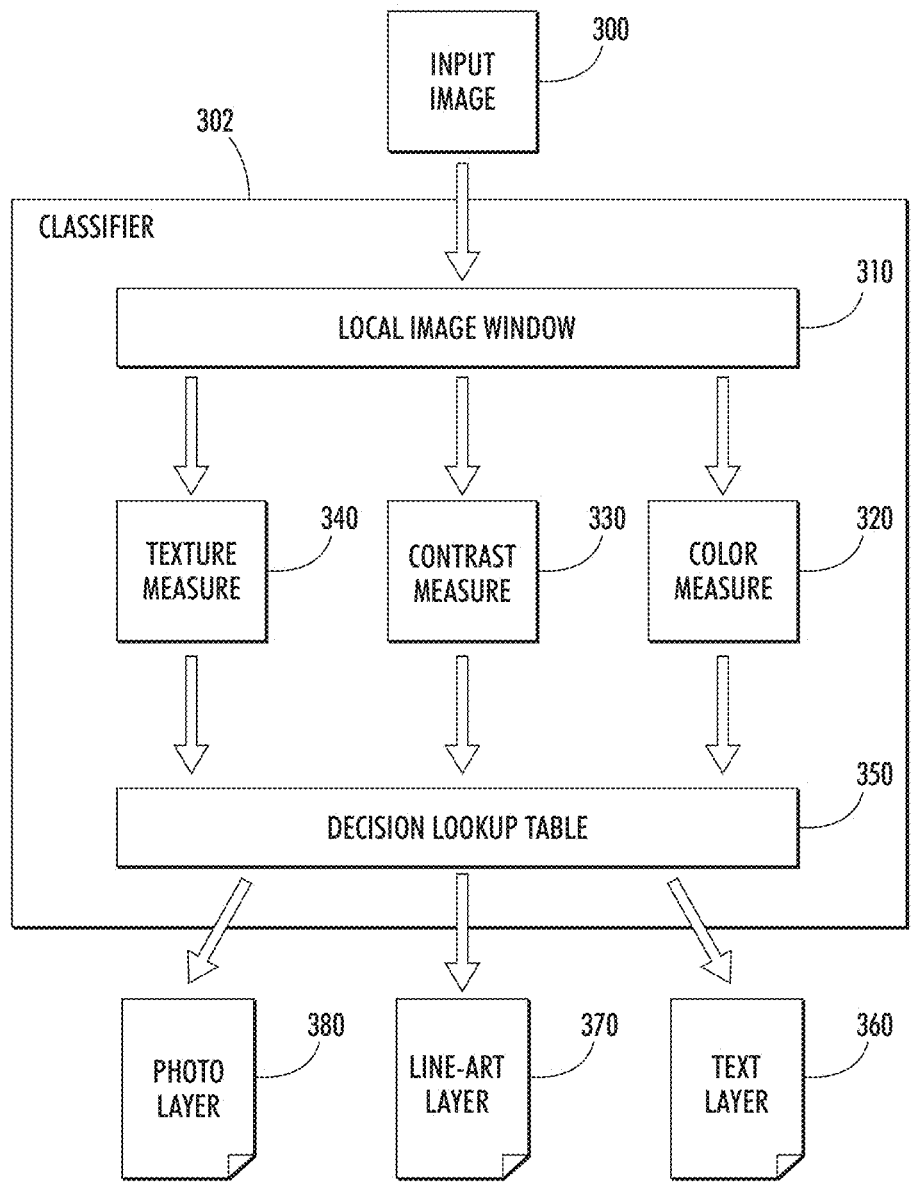
FIG. 3 illustrates a method of classifying input image pixels based on local image properties and separating the input image into three image (or output) layers labeled as: text layer, line-art layer, and photo layer.

An embodiment of classifying input image pixels based on local image properties according to the present application is illustrated in FIG. 3. Initially, classifier 302 is shown accepting an input image 300. A local image window 310 is provided and will be passed over the input image 300, to separate the input image into three image layers labeled in this embodiment as: (a) text layer 360, (b) line-art layer 370, and (c) photo layer 380. Depending on the visual fingerprinting method, the local image window size may be fixed or variable. For local appearance based fingerprinting a fixed window size is used.

For each image pixel of the input image 300, the classifier examines the image properties in local image window 310, which is centered at a current input image pixel of interest. The window content is examined by three independent detectors in parallel.

A color measure detector 320 analyzes the color distribution of pixels in the local window, to determine the number and modality of colors. Two narrowly concentrated colors indicate text-like properties, a set of more than two distinct colors indicate line-art properties, and a range of smoothly varying colors is indicative of photo images.

A contrast measure detector 330 analyzes the normalized contrast and edge sharpness for edge pixels within the local window. Edge pixels are classified as neighboring pixels whose difference in luminance exceeds a certain threshold. The value of the threshold is dynamically computed from local window content. High contrast and sharp edges indicate text-like properties, while low pixel-to-pixel contrast is indicative of natural photo images.

A texture measure detector 340 analyzes the normalized texture response for pixels within the local window. The texture response is defined as the number of particular peaks found in overlapping 3×3 window positions inside the local window, where a peak indicates a center pixel a 3×3 window that is either larger or smaller, by a specified threshold, than any of its eight (8) immediate nearest neighbors, in any horizontal vertical or diagonal direction, The number of such peaks is proportional to the frequency in the local window. The value of the texture measure is useful in discriminating halftone and other objects that may have been dithered in advance to create the illusion of simulated colors from a small subset of primary colors such as cyan, magenta, yellow and black as is traditionally done for printing.

Other types of detectors may additionally be optionally added in parallel for detecting special cases such as a particular background highlight color, etc.

The outputs of the three detectors 320-340 are fed to a decision lookup table 350. The decision lookup table is configured to combine the detector outputs and produce generally one, and occasionally more than one, distinct output labels for each image pixel, classifying the output as text, line-art, and/or photo image based on the local image properties. The implementation as a lookup table provides flexibility and ease of tuning for particular application needs. The lookup table is internally configured as three independent tables, each of which controls the assignment of a particular image pixel to one of the output layers such as (a) text layer 360, (b) line-art layer 370 and (c) photo layer 380. A separate address is computed for each of the three lookup tables based on the various detector output values of the color measure 320, the contrast measure 330, and the texture measure 340. For example, a high contrast value when combined with a peak bi-color distribution is likely to indicate the presence of text content. The corresponding text layer table content is therefore programmed in such manner as to pass the input pixel to the text layer output when the contrast value exceeds a certain threshold value and the color measure output peaks around 2 colors. The various detector outputs are concatenated together to form an address into the tables, and the particular formula and threshold values are programmed in advance into the individual lookup table content. This method provides convenient design flexibility, since it is well known that any desired input-output characteristics can be programmed and easily adjusted by using an arbitrary lookup table. Depending on the application, the output of the decision lookup table 350 may or may not be restricted to have mutually exclusive labels.

Finally, content of the pixel under investigation (e.g., the center window pixel) is copied to one or more of the image layers: the text layer 360, the line-art layer 370, and/or the photo layer 380 in accordance with the labels outputted by the classifier decision lookup table 350.

In one embodiment the image layers 360-380 are formed by sliding local image window 310 across input image 300 from left to right and top to bottom to cover the entire input image area, and repeating the above process at each window position. Each image layer is then independently fingerprinted, and the resulting visual fingerprints are correspondingly tagged by the category label of that layer. The fingerprints are then stored and indexed. During indexing, the different types of fingerprints (e.g., text labeled fingerprints, line art labeled fingerprints, and photo labeled fingerprints) are independently hashed and organized for fast and efficient fingerprint lookup. The above processes are repeated for a plurality of input document images of a document collection, such that a database of fingerprints, classified as text fingerprints, line-art fingerprints, and photo fingerprints are stored in a manner for quick retrieval during a document content searching or matching operation.

Examples of generating fingerprints and using them for document content search or matching are discussed in:

U.S. patent application Ser. No. 12/147,624 (20080166-US-NP): METHOD AND SYSTEM FOR FINDING A DOCUMENT IMAGE IN A DOCUMENT COLLECTION USING LOCALIZED TWO-DIMENSIONAL VISUAL FINGERPRINTS, Kletter, Saund, Janssen, Atkinson U.S. patent application Ser. No. 12/147,867 (20080302-US-NP): SYSTEM AND METHOD FOR FINDING STABLE KEYPOINTS IN A PICTURE IMAGE USING LOCALIZED SCALE SPACE PROPERTIES by Kletter.

U.S. patent application Ser. No. 12/163,186 (20080303-US-NP): METHOD FOR FINDING A PICTURE IMAGE IN AN IMAGE COLLECTION USING LOCALIZED TWO-DIMENSIONAL VISUAL FINGERPRINTS by Kletter.

During the searching or matching of document content, a query document image page is provided to classifier 300, and processed in a similar fashion as the input images of document image pages described above. The query document image page is separated into multiple image layers by category type and each layer fingerprinted in the same manner as outlined above. The resulting query image fingerprints are looked up by category type and compared with the corresponding fingerprints stored as part of the collection the document image pages. The resulting lists of matching documents are merged together to form a single list based on a weighted confidence and/or page similarity level. In one embodiment the best matching document in the collection would then be the document with the largest overall weighted fingerprints confidence and/or page similarity level across all category types (e.g., text, line-art, photo images).

Depending on the application, the weights of each category (e.g., text, line-art, or photo images) may be adjusted to increase or decrease the relative importance of the particular object category in the overall matching.

In the present method and system embodiment different types of query fingerprints are only compared with fingerprints of the same type from the collection. By separating the text, line-art, and photo information into independent image layers the resulting visual fingerprints remain true to category type and prevent local "mixing" of different object types such as text, line-art, and photo images, thereby preventing the creation of hybrid fingerprints.

Figure 4:
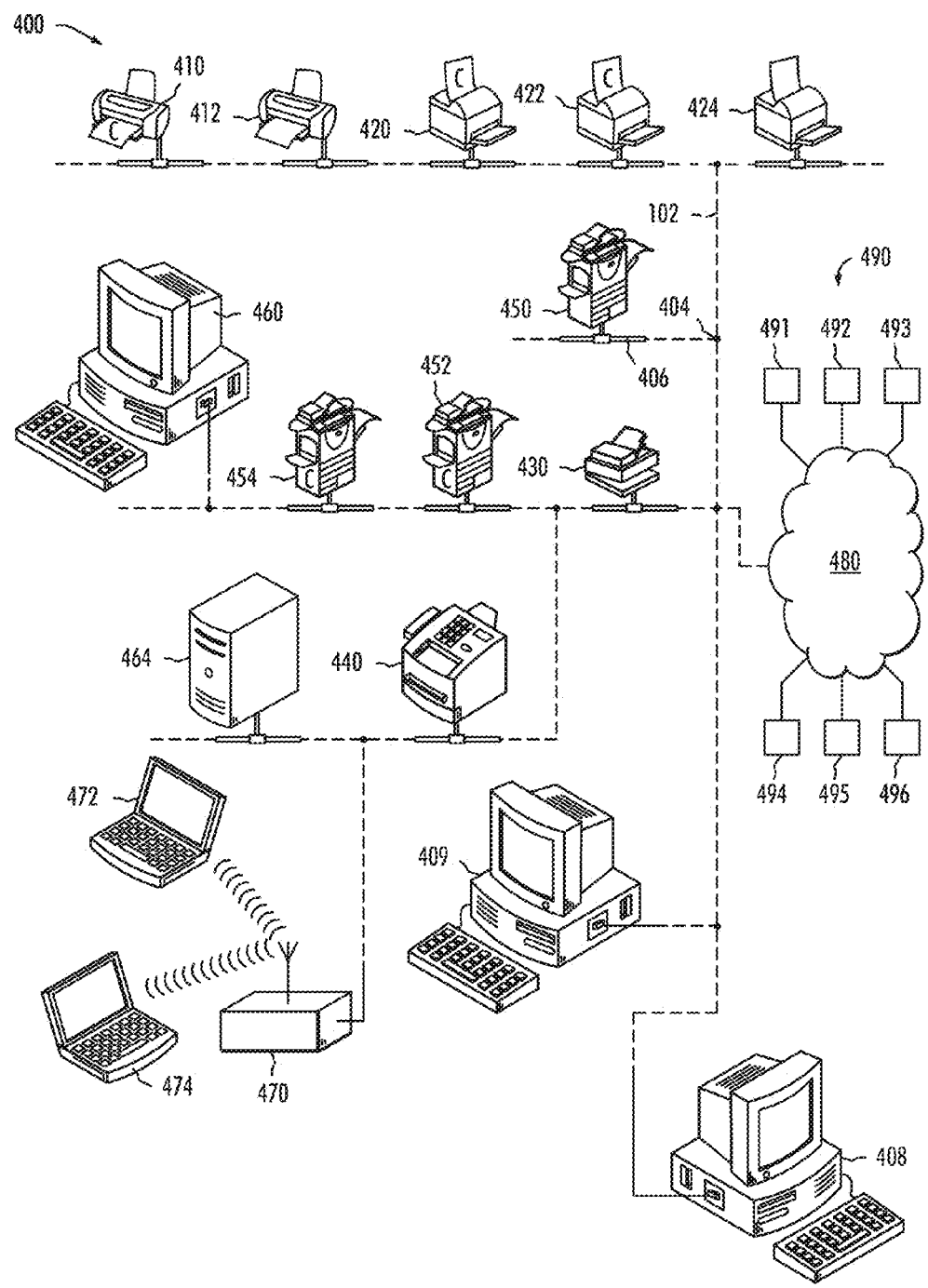
FIG. 4 sets out an environment in which the concepts of the present application may be implemented.

The system and method as described herein may work within a variety of environments including but not limited to a network as illustrated in FIG. 4. The network 400 is comprised of a series of connections such as wires 402, many of which may branch or join with a third wire 406 at a wire junctions 404, may connect a standalone peripheral device or pass through a peripheral to connect to other devices, such as computers 408, 409, wherein a computer may be considered a peripheral device. The network may incorporate a color printer 410 or other than color printer 412 as well as at least a color laser printer 420, 422 or one other than color laser printer 424. The network may also incorporate a scanner 430, or a fax machine 440, a photocopier 450, a color photocopier 452, or a combination color printer/scanner/fax machine 454. The network may also contain a personal computer and/or standalone computer terminal 460, or standalone hard drive data storage medium 464. The network may also contain a wireless network transmitter receiver 470 and interface with at least one laptop computer 472, or a plurality of laptop computers 474. The network may also interconnect with any form of network 480 including but not limited to the Internet, an Intranet or other communication network. Through use of an interface with another form of network, the present system and method may interface with a plurality of peripheral data capturing devices 490 including, but not limited to a digital still camera 491, a digital video camera 492, a cellular telephone 493, a scanner 494, a personal data assistant 495, or a document indexing system 496. It is to be understood the present concepts may be implemented in networks having various combinations of the above components, going from a network having a single device to one which includes thousands or more connected devices. Further, various ones of the above components may have memory storage areas arranged in any of a number of known configurations which may be useful in implementing the concepts to be described. The storage areas may be RAM, ROM, Flash Memory, web services, cloud storage facilities or other memory types which can hold software incorporating the concepts of the present application. Other memory storage areas may be configured to hold various digital images in any of a number of database formats. Still further, various ones of the components of FIG. 4, such as but not limited to the computers, include processors to process instructions from software loaded on or otherwise accessible by the components. It is to be understood various ones of the components having the processors may have more than one processor whereby processing of the instructions can be divided among the multiple processors. Alternatively, a single processor can operate to divide the instructions, whereby processing can occur in a multi-threaded environment. The computers may be other computing devices than those mentioned above and will include electronic/digital processors as well as or in the alternative graphical electronic/digital processors (GPUs).

The above material related to finding two-dimensional fingerprints, and query searching is set out in more detail by the documents incorporated by reference herein. This material details the finding of keypoints to generate the visual fingerprints as well as, building a Fan Tree for quick retrieval of the fingerprints and searching for content between the query document image page and a collection of fingerprinted document image pages. The following FIGS. 5-10 and accompanying language sets forth an additional discussion of these concepts.

a.1 Detection of Document Keypoints

A goal of the keypoint identification is to repeatedly and reliably find as many of the keypoints even in a degraded version of an image that is subject to at least one of, but not limited to noise, scene lighting variations, and affine transformations such as skew, warp, rotation, translation, scale, change of resolution, and the like.

Figure 5:
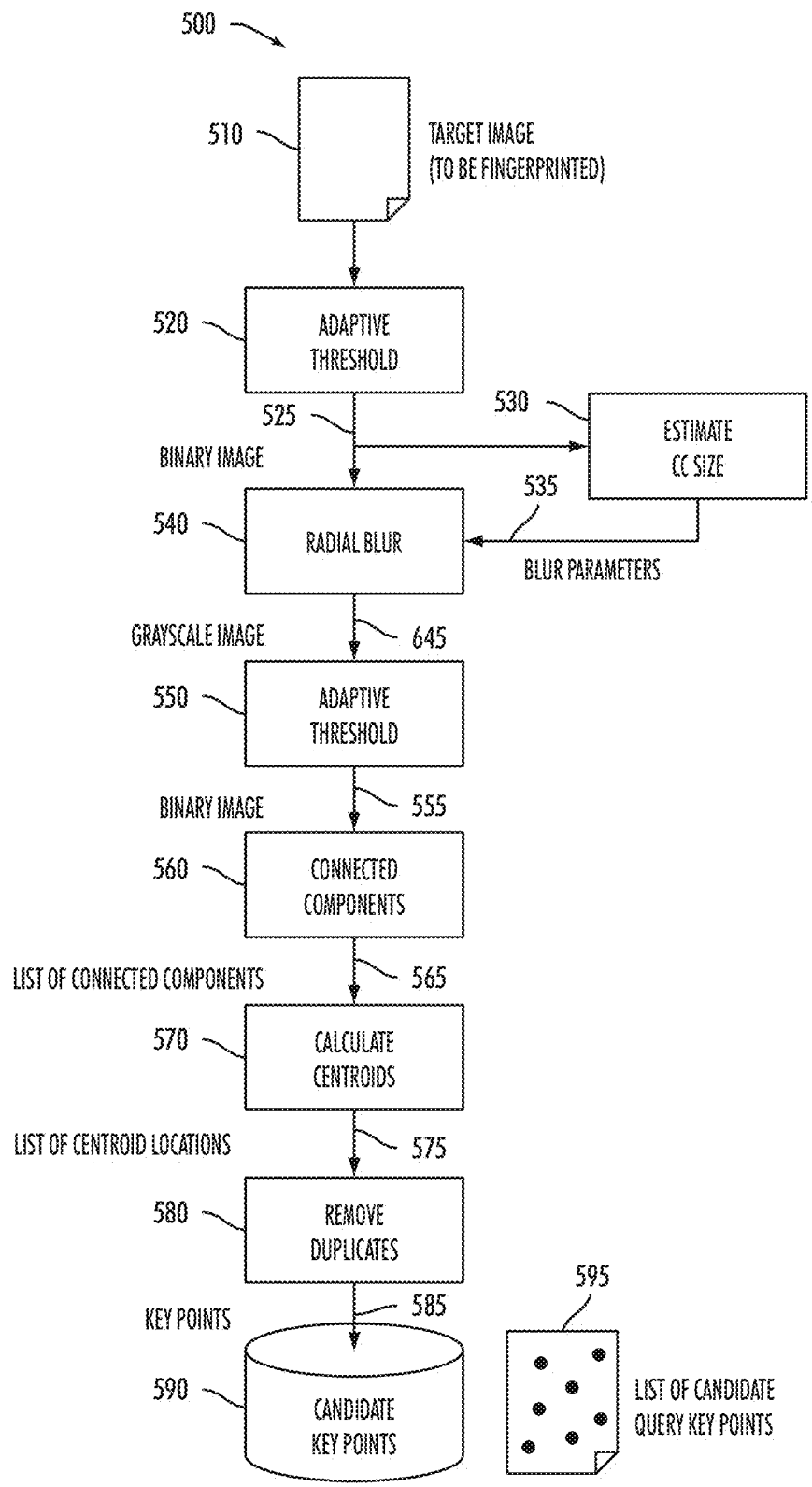
FIG. 5 is a method of identifying Candidate Keypoints in target documents.

One particular process of detecting document keypoint locations 500 of a target image 510 to be fingerprinted is shown in FIG. 5. Image processing of adaptive thresholding, blurring, and connected component collection are well known in the literature. It is desirable to perform the keypoint identification process in a perceptual image space in accordance with the properties of the human vision system.

A binary output image 525 of a first Adaptive Threshold module 520 is sent to an Estimate CC Size module 530. The term CC here stands for Connected Component, which is a maximally connected sub-group of binary pixels having the same polarity. Two pixels are in the same connected component if and only if there exists a path of the same polarity pixels between them. The purpose of the Estimate CC Size module 530 is to dynamically estimate, for the target image 510 on an image by image basis, the blur parameters 535 or blur filter size to be applied in the subsequent Radial Blur module 540. The objective of the blurring process is to provide robust, reliable, and repeatable keypoint identification. The blurring also helps to remove noise such salt and pepper noise and eliminate small isolated features on the page. The shape of the blurring filter, for example but not limited to an approximated Gaussian shape, should be smooth enough to prevent from introducing undesirable artifacts.

The output of the Radial Blurring module 540 is a grayscale image 545. The Adaptive Threshold module 550 converts the grayscale Radial Blur 540 image output 545 to binary black and white output 555 by adaptive thresholding 550.

The binary output of the second Adaptive Threshold module 550 is a binary image 555 and is forwarded to the Connected Component module 560. Connected component methods are well known in the art, and may be considered a set of maximally connected components of a graph.

The Calculate Centroid module 570 determines the visual center of each connected component at the output of the Connected Component module 560. For each connected component, the horizontal centroid location is calculated by summing together the horizontal coordinates of each member pixel of the connected component and dividing the outcome by the total number of member pixels. The vertical centroid location is likewise calculated by summing together the vertical coordinates of each member pixel and dividing by the number of member pixels. The summation can be effectively done on-the-fly during the connected component analysis. Note that only the pixel members of a given connected component contribute to its centroid location, ignoring any other non-member pixel "holes". The visual centroid of each connected component is calculated with sub-pixel precision, since in many languages the connected components tend to be situated in text lines.

In the last processing step of the keypoint identification phase, the list of connected component centroid locations 575 from the Calculate Centroid module 570 is validated by the Remove Duplicates module 580, which produces a list of keypoints 585. The purpose of the validation is to ensure that no two connected component shall have the same centroid locations within a given tolerance level. Duplicated connected components with nearly the same centroid locations are eliminated.

The list of remaining connected component centroids at the output of the Remove Duplicates module 580 becomes the final candidate query keypoints list 595. The overall number of candidate keypoints 590 depends on the Input image content and the type of connected component processing. There can be several hundred keypoints for a typical machine printed page.

a.2. Construction of Fingerprints

This section describes the process of computing fingerprints from local groups of keypoints and packing the fingerprints for efficient storage in a Fingerprint Lookup Index or Database. The fingerprints are packed to reduce the Fingerprint Lookup Index or Database size and storage requirements.

We seek to identify robust 2D visual fingerprints in the input image that will be stable across a wide range of noise, viewing conditions, and image distortions. In addition, fingerprint size can be minimized in order to enable the system to effectively scale up to handle very large document collection sizes such as a collection containing millions or billions of documents. Since the fingerprint database consists of all the valid fingerprints in the collection. At the same time the fingerprints are expected to identify the individual content they represent with high accuracy and confidence.

Fingerprints are constructed as sequences of quantized, transformation-invariant 2D ratios, called persistent ratios, which are derived from the relative 2D positions of a given keypoint and its (N−1) nearest-neighbor keypoints. Thus each fingerprint is localized to a small image neighborhood around the keypoint of interest. A fingerprint sequence is dependent only on the relative 2D geometry between the keypoint of interest and its (N−1) closest keypoint neighbors. The number of neighbors N is a design parameter that influences the fingerprint strength.

An aspect of the present application lies in making the fingerprints robust to certain image distortions such as, but not limited to skew, warp, rotation, translation, scale, change of resolution, and the like, that commonly occur during the process of scanning or taking a picture of the image with a digital or a cell phone camera.

Figure 6A:
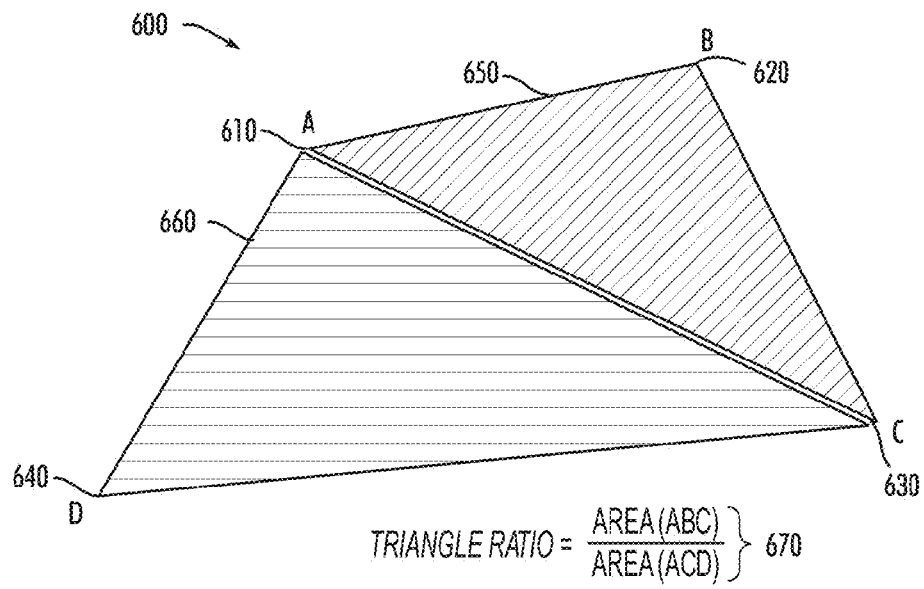
FIG. 6A illustrates the method of obtaining a Triangle Ratio for construction of Fingerprints.

As illustrated in FIG. 6A, it is well known in the art that for any given polygon 600 comprised of four non co-linear points {A, B, C, D} (i.e., 610, 620, 630, 640), on the object surface, comprising a triangle ABC 650 and a second triangle ACD 660, the ratio of triangle areas (ABC/ACD) 670 remains constant under any affine transformation. Hence only P=4 points are needed to calculate one triangle area ratio, illustrated as the Triangle Ratio 670. This affine transformation has been shown to provide an acceptable model for describing the camera to planar object geometry in many practical situations.

In another embodiment, for situations where a transformation order larger than affine is required to describe the image model, the transformation can be extended to handle perspective transformation using P=5 points (instead of 4) to calculate a single persistent ratio which is the product of two triangle ratios.

Figure 6B:
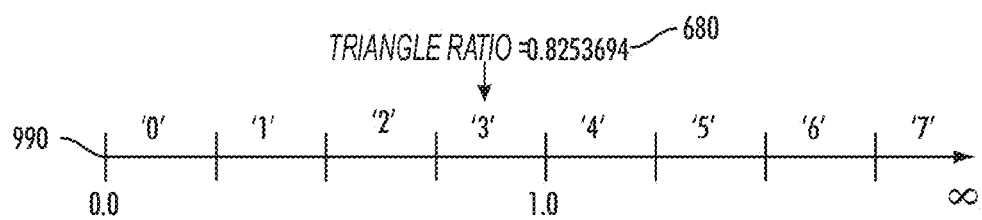
FIG. 6B is the Quantization of the Triangle Ratio of FIG. 6A

A single fingerprint is therefore comprised of a sequence of quantized persistent transformation ratios for a group of N nearest neighbor keypoints sorted in clockwise order. To keep the fingerprint size small, the transformation ratio is quantized to Q-levels 680. In one embodiment, the value of Q can be conveniently chosen to be a binary power of two. In FIG. 6B, the quantization process is illustrated as the Quantization of the Triangle Ratio 680 of FIG. 6A for the case of Q=8. The valid range (0,∞) of a Triangle Ratio before quantization is divided into Q=8 intervals labeled '0' to '7' as shown in FIG. 6B (690). The interval boundaries are determined empirically to provide approximately uniform distribution of quantization labels over a large set of representative documents. The incoming triangle ratio value 680 is sequentially compared with increasing interval boundaries to determine the first higher or equal interval boundary, upon which the process is terminated and the corresponding label interval is assigned as the quantized result. For example, an incoming triangle ratio of 0.8253694, being less than 1.0 and higher than the previous interval boundary, is assigned a quantized value of '3'.

A potential issue in using the nearest neighbor method is that nearness is not necessarily preserved under perspective transformation. There can be no guarantee that the N nearest neighbors of a given keypoint will remain exactly the same N keypoints under arbitrary affine or perspective transformation. Still, the closest keypoints are more likely to remain in the list of N nearest neighbors than keypoints that are farther away.

To overcome the above issue, the present application proposes to allow one or more of the neighbor keypoints to be missing in order to further increase the robustness of a fingerprint to affine or perspective transformation. Under one embodiment, one keypoint is allowed to be excluded under the consideration of limited affine distortions in small localized neighborhoods. Thus each given keypoint gives rise to a number of fingerprints N, by leaving out one keypoint at a time. Each fingerprint is created by systematically walking a remaining number of keypoints, N−1, in radial order of orientation, and recording the sequence of quantized persistent ratios for all the possible combinations of P points (P=4 for affine, P=5 for perspective transformation).

Figure 7:
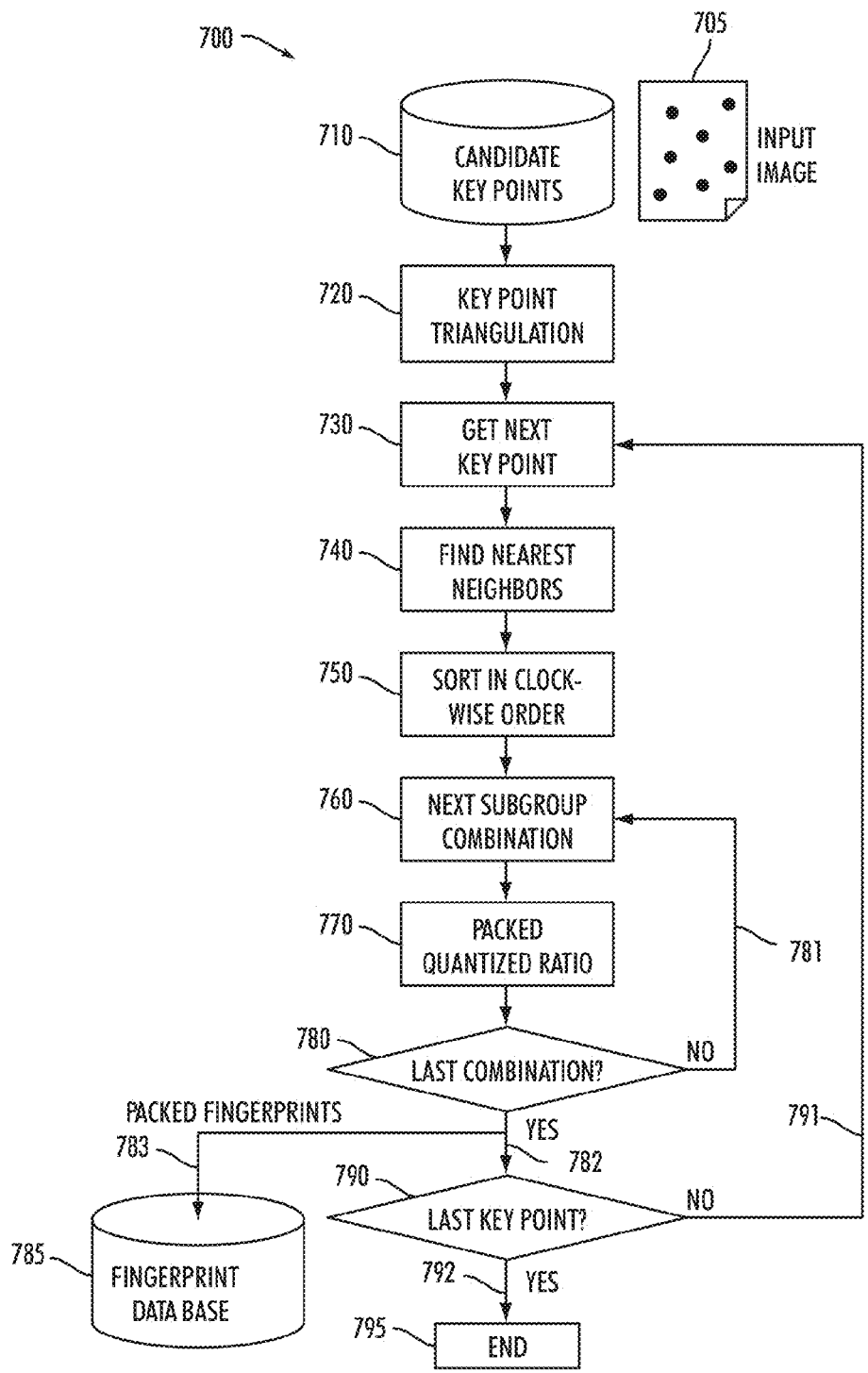
FIG. 7 is a method of Generating a Packed Fingerprint Database from Keypoints.

A Fingerprinting process 700 is shown in detail in FIG. 7. The input to Fingerprinting process 700 is the list of candidate keypoints 710 for the input image 705. The first Fingerprinting processing step in FIG. 7 is the Keypoint Triangulation module 720. In this embodiment Delaunay or Keypoint Triangulation 720 are used to identify the nearest keypoints to each given keypoint in a local neighborhood. By following the triangulation links, the nearest (N−1) neighbors to any given keypoint can be effectively determined.

Each candidate keypoint and its (N−1) nearest neighbors is considered as a fingerprint candidate. Each current candidate keypoint Kp is selected sequentially from the input list 710 by the Get Next Keypoint module 730. For each keypoint Kp, the Find Nearest Neighbors module 740 identifies the (N−1) nearest keypoints with the closest distance to the given keypoint Kp, where N is a given parameter. The Find Nearest Neighbors module uses the Delaunay or Keypoint Triangulation result 720 to return a list of the closest keypoints to Kp, sorted by increasing distance from Kp. The first element of the returned list is always the current keypoint Kp (with a distance of zero). The value of the parameter N is adjusted to provide a reasonable tradeoff between the fingerprint "strength" or distinctiveness, the overall system performance, quantified as the number of computations per fingerprint, and the resulting database size or fingerprint size. In this example the values, N=8, 12, or 16 are used.

The points of the Find Nearest Neighbor module 740 need to be taken in a consistent order so that sequence of area ratios will be consistent for the same keypoint/neighborhood between database and query images. The Sort in Clockwise Order module 750 sorts the list of N nearest neighbor keypoints of a given keypoint in increasing clockwise orientation.

The Sort in Clockwise Order module 750 includes a method and system to stabilize keypoint ordering with respect to the common case of nearly co-linear keypoints. The Sort in Clockwise Order module 750 uses the first M nearest neighbors, where M<N, on the list (the closest to the given keypoint) to calculate a subgroup center of origin. The farthest (N−M) keypoints are not used in calculation of the subgroup center of origin, in order to ensure that origin will remain stable under affine or perspective transformation. In the present implementation the Sort in Clockwise Order module 750 uses the average location of M=5, when total N=8, nearest neighbor keypoints as the center of origin for the purpose of determining keypoint ordering.

After determining the origin center of the current neighbor keypoint cluster, the Sort in Clockwise Order module 750 proceeds to sort the keypoints in increasing clockwise orientation order. The sorting is done on both the orientation and distance. The order is by increasing clockwise orientation order. However, if two or more points have roughly the same orientation, where the difference is within a predefined tolerance level, the points are sub-ordered by increasing distance for all the points of a substantially similar orientation.

For each unique subset of N keypoints, the Next Subgroup Combination module 760 systematically and methodically selects the next subgroup combination of P=4 or P=5 keypoints depending on affine or perspective transformation case. For example, for N=8 there are 70 unique combinations of P=4 keypoint subgroups.

For each Next Subgroup Combination of P=4 keypoints, the Packed Quantized Ratio module 770 calculates a single persistent ratio and quantizes it using a set of predefined interval boundary thresholds. The number of quantization levels Q is a design parameter. In these examples, Q=8 or Q=16 are used. The quantization threshold values are determined empirically by studying the distribution of persistent ratios in a large collection of documents of a particular type.

In order to further reduce the size of the Fingerprint Database 785, the Packed Quantized Ratio module 770 packs a number of the resulting quantized persistent ratios into one machine word. For example, with N=8, P=4, and Q=8, the entire fingerprint sequence of 70 subgroup combinations can be tightly packed into less than four 64-bit words. In one embodiment of the present application, the size of a packed fingerprint occupies a total of three 64-bit words and three 8-bit bytes with no need to split partial information across multiple words or bytes.

The process of calculating and packing the fingerprints continues sequentially, one persistent ratio at a time, until the last combination is detected by the Last Combination module 780. If the current P subgroup combination is not yet the last combination 781, the Last Combination module 780 routes the flow back to the Next Subgroup Combination module 760, to obtain the next P subgroup and proceed to calculate its quantized persistent ratio and pack it. This process continues until the last P subgroup combination has been processed 782. At this time, the resulting packed fingerprint data 783 is written to the Fingerprint Database 785. Note that the fingerprint data can be written to the Fingerprint Database 785 sequentially, one fingerprint at a time, as each packed fingerprint data is becoming available.

Finally, the process of writing the fingerprints continues sequentially for all the remaining keypoints, until the last keypoint is detected by the Last Keypoint module 790. If the current keypoint combination is not yet the last keypoint 791, the Last Keypoint module 790 routes the flow back to the Get Next Keypoint module 730, to obtain the next keypoint and proceed to repeat the process to calculate its packed fingerprint and adding it to the Fingerprint Database 785. The Fingerprinting process continues in this manner until the last keypoint combination last corresponding fingerprint has been processed 792 and added to the Fingerprint Database 785. Once the last keypoint has been addressed, the process ends 795.

Figure 8A:
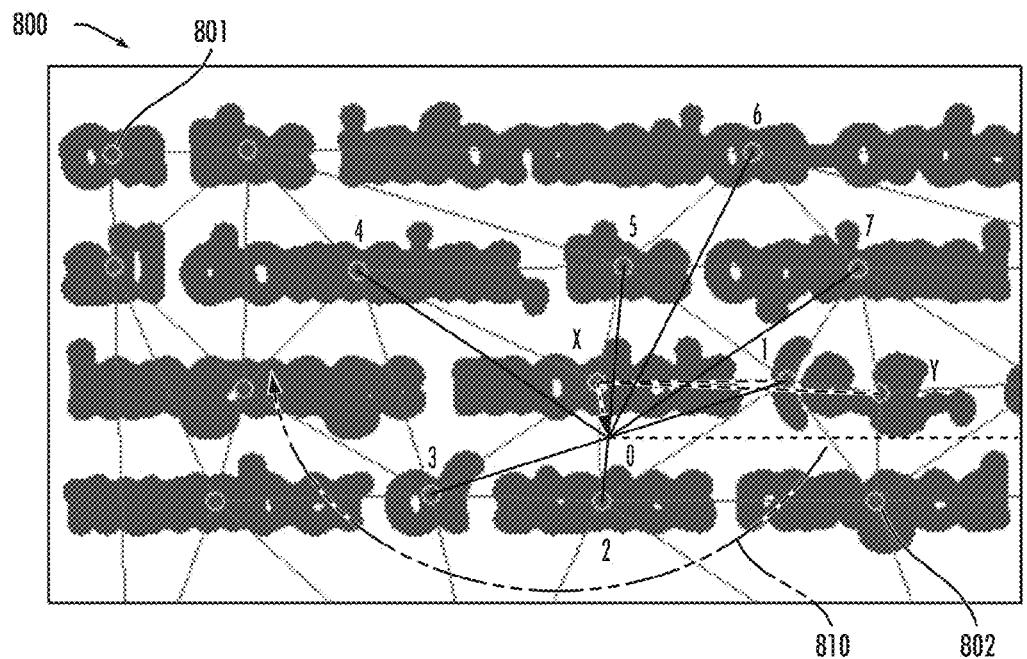
FIGS. 8A and 8B illustrate a method of Sorting of Nearest Neighbor Keypoints in Clockwise orientation order.
Figure 8B:
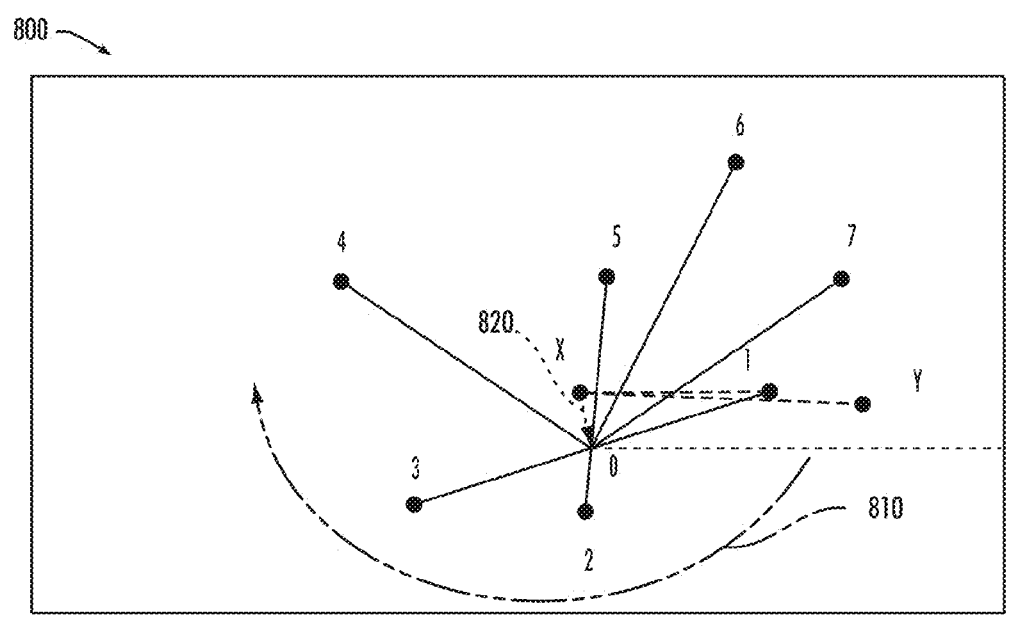

A method of calculating the fingerprint center of origin is illustrated in FIGS. 8A-8B. FIG. 8A illustrates the process with respect to a given example image 800. The processed image is shown with the keypoints or word centroids identified by circles such as circles 801-802. These are set forth only as examples, and the other circles in the figures are also word centroids. For example, numbers (1-7) also represent word centroids which are near neighbor keypoints to point X. FIG. 8B eliminates the background processed image for better clarity, but is otherwise the same as in FIG. 8A. In this example, a fingerprint is computed for the keypoint X, using seven additional keypoints (1-7) in the local neighborhood. In the first step, the center of origin for this fingerprint is calculated using the closest M=5 keypoints to keypoint X, that is, the average location of the points {X, 1, 2, 3 and 5}. This is likely to move the center of origin away from the point X, and away from the co-linear line of keypoint along the text line Y which includes the keypoint X, to a new center of origin following arrow line 820 to point 0. The three most distant keypoints (4, 6, 7) of the seven (1-7) are not used for the center of origin calculation to stabilize the point 0 location by allowing for up to three (3) points to be shifted by arbitrary affine or perspective transformation. In the second step, the entire set of eight keypoints (X and 1-7) are sorted in clockwise order 810 with respect to the newly calculated sub-group center of origin (0), resulting in the final output sequence ordering of (1, X, 2, 3, 4, 5, 6, 7) in this case. With attention to the ordering of keypoints, it is to be understood the above-described ordering depends on the point of reference. If "0" is used as the point of reference, the resulting sequence would have been 234X5671 since 1 is above the dotted line from "0". The alternative as used here is to continue to use X as reference, but pretend the keypoint mass is moved to "0", which yields the listed sequence. In the foregoing, the latter has been used, since it keeps the original keypoint location as reference, while the point "0" may move around X and cause the flipping of keypoint sequence order. However, it can be done either way, as what needs to be accomplished, in either case, is to be able to repeat the same sequence in both target and query image. Note that the objective of the second step is to sort in clockwise order, not by distance.

Once the ordering of N nearest neighbor keypoints has been established for a given keypoint, a fingerprint can be generated. Fingerprints are formed from successive subsets of size P=4 of the keypoints in a neighborhood by excluding one or more keypoints at a time and constructing a sequence of the remaining subgroup combinations of non-excluded keypoints. Thus a group of fingerprints can be effectively constructed from the packed sequence of subgroup combinations. P-subsets of the N keypoints are considered in a systematic and consistent manner. For each, an integer is determined by computing the persistent area ratio for that P-subset, and mapping the area ratio to an integer as described herein. The length of a fingerprint for the given keypoint is the total number of such P-subsets. This is determined by the number of combinations for choosing unique P keypoints out of N keypoints. For example, if N=8 and P=4, the number of possible subgroup combinations is 70 persistent ratios. Of these, 8 fingerprints of length 35 subgroup combinations each can be constructed, for example, by excluding one keypoint at a time.

a.3. Preparing Fingerprints Information For Fast Matching

Figure 9:
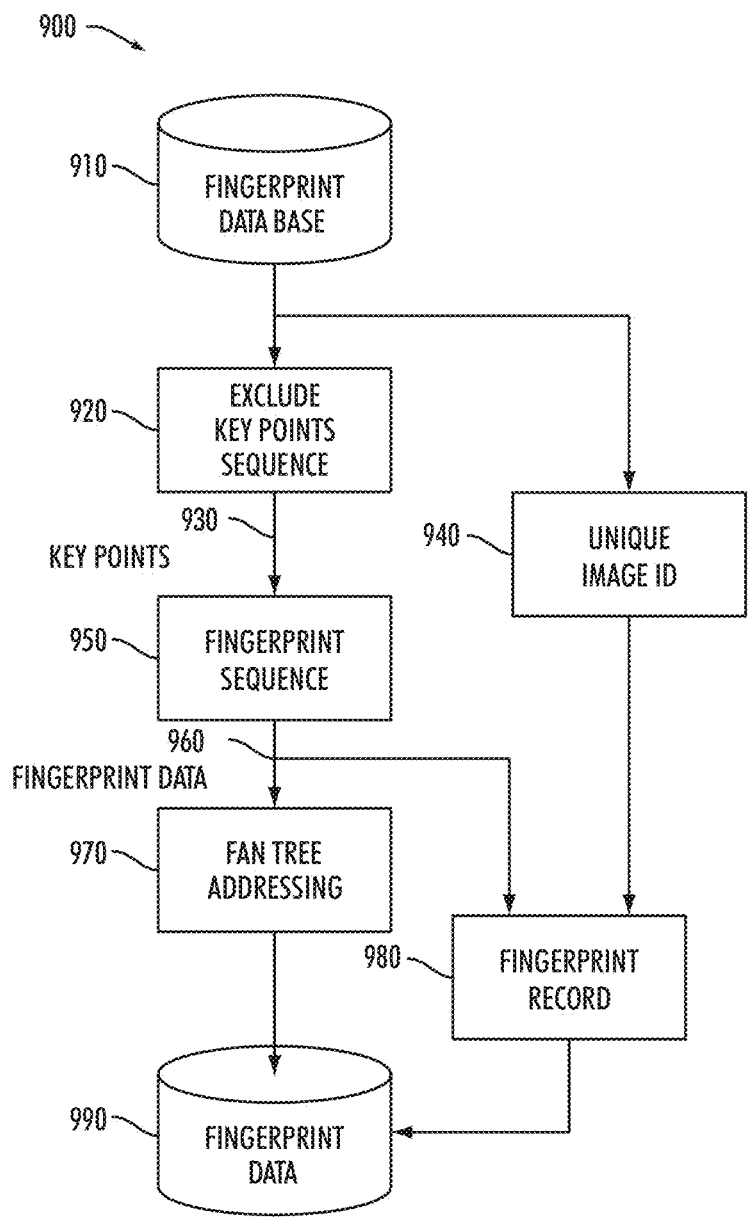
FIG. 9 is a method of building a Fan Tree from the Fingerprint database.

As illustrated in FIG. 7, the fingerprints in the Fingerprint Database 785 are stored in a packed format to reduce the memory size and loading time Therefore to facilitate efficient fingerprint matching they are unpacked and re-organized in a unique manner in accordance with a Fan Tree data structure as shown by flow 900 of FIG. 9. Note that it is only necessary to prepare the Fingerprint Database once, upon the first image query. The Fan Tree data structure (containing the unpacked fingerprint sequences) can be kept in memory and subsequently reused with any number of image queries.

A method of preparation of a packed fingerprint database 785 (also shown as 910 or FIG. 9) was described in FIG. 7. FIG. 9 now describes a method of building a Fan Tree from the fingerprint database, to allow the fingerprint information to be quickly retrieved. It is noted each fingerprint database entry gives rise to multiple candidate fingerprints.

In the process, the Exclude Keypoint module 920 selects multiple candidate fingerprint keypoint combinations by excluding one or more of the fingerprint keypoints 930. This allows for one or more missing keypoints among the local neighborhood keypoints. In the present implementation, the Exclude Keypoint module leaves out one keypoint. With a local neighborhood of N keypoints, this gives rise to N fingerprints for each database entry, or N fingerprints per keypoint since a database entry is made for each keypoint.

The Fingerprint Sequence module 950 generates the sequence of N candidate fingerprints for each keypoint. For example, when N=8, the Exclude Keypoint module 920 will cause the first fingerprint to be generated by leaving out the first keypoint and selecting the seven remaining keypoints. After that, the Exclude Keypoint module will leave out the second keypoint and select the first and six last keypoints for creating the second fingerprint. This process continues until all excluded keypoint combinations have been encountered. In this example each database entry will generate 8 candidate fingerprints, each of length 7 choose 4=35.

With N=8 and P=4, there are (8 choose 4)=70 unique combinations of 4 keypoint subgroups. This is what gets stored in the database 910 in a packed format for each keypoint.

Next fingerprints for the case of a single missing keypoint are generated. However, which keypoint may be missing is not known in advance, so preparation for all possibilities is undertaken. With N=8, there are 8 possible ways of a single missing keypoint: either the first, or the second, or third, etc.—for a total of 8 cases. A different fingerprint for each one of these cases is computed. Each fingerprint in this case is only based on 7 keypoints (because one of the original 8 is missing). Thus the length of each fingerprint in this case is (7 choose 4)=35, and there are 8 of them total. This means that each fingerprint is comprised of a sequence of 35 integers (quantized ratios) in the range 0-7. The 8 fingerprints are added to the Fan Tree data.

At query time, 8 keypoints (current and 7 closest) are generated, and again 8 query fingerprints are computed using the same method, and likewise excluding one keypoint at a time. Then an attempt is made to match the keypoints against the Fan Tree content. Matching is stopped upon the first obtained match. If a single keypoint is missing from the query image (it does not matter which), one of the query fingerprints out of the 8 is bound to have a match (to the one with the 7 other keypoints present). And if no keypoint is missing (all 8 present), then there would be 8 matches (because any group of 7 will match), except the process stops after the first positive match since there is no need to continue checking. If, however, two keypoints or more are missing at the same time, there would be no match for this location. If so desired, the system could easily handle more missing keypoints by extending the method to allow more missing keypoints (e.g., 2 out of 8, etc.).

The Fingerprint Data 960 output from the Fingerprint Sequence module 950, together with the unique image ID 940 that is retrieved from the database for the current image, form a fingerprint record 980. The fingerprint record 980 is stored in a corresponding Fan Tree Leaf node location which is addressed by the Fan Tree addressing module 970. The Fan Tree Leaf node information is stored as a linked list of fingerprint records 980 in the corresponding Fingerprint Data structure 990. Only the actual Fan Tree Leaf nodes corresponding to real fingerprints are populated. The first fingerprint to arrive at a particular leaf node populates that leaf node for the first time. If more than one fingerprint happens to arrive at the same leaf node again (i.e., following the same Fan Tree path), the new fingerprint information is added at the same leaf node by linking the new fingerprint information with the last previous fingerprint information on that leaf node.

It is to be understood various ones of the above processes which are used to prepare the page images in the document collection can be similarly used, with some modification, in the query operations. For example, the candidate keypoint identification process of FIG. 5 can similarly be used to identify candidate query keypoints, modified to, for example, include image enhancement. Further, additional processing operations are available to improve the accuracy of the results such as nose-guarding, among others.

Additionally, it is to be understood that while the above describes a system and method for classifying objects (e.g., text, line-art, photo, among others) from which keypoints are generated and document queries performed, in one embodiment, in accordance with the method and system set out in U.S. patent application Ser. No. 12/147,624 (20080166-US-NP): METHOD AND SYSTEM FOR FINDING A DOCUMENT IMAGE IN A DOCUMENT COLLECTION USING LOCALIZED TWO-DIMENSIONAL VISUAL FINGERPRINTS, Kletter, Saund, Janssen, Atkinson, alternative processing to find fingerprints and perform query searching of documents can be used in accordance with the concepts of the present application.

For example, the method and system described in U.S. patent application Ser. No. 12/163,186 (20080303-US-NP), titled METHOD FOR FINDING A PICTURE IMAGE IN AN IMAGE COLLECTION USING LOCALIZED TWO-DIMENSIONAL VISUAL FINGERPRINTS by Kletter, describes a system and method which is able to provide improved fingerprinting of document images having photo objects and may employ the classifying concepts of the present application, among others.

Particularly, the above application employs anchor keypoints, in place of keypoint triangulation (720 of FIG. 7). Where an Anchor Keypoint Identification module selects a suitable subset of anchor keypoints among the candidate keypoints found in an input image based on various criteria such the keypoint strength, scale, location, and\or proximity to other keypoints. Then after getting a next keypoint (730 of FIG. 7), the process finds the nearest anchor points, before finding the nearest neighbors (740 of FIG. 7). Another distinction is that in the sort in clockwise order process, the Sort in Clockwise Order module (e.g., 750 of FIG. 7) sorts the list of N−1 nearest anchor and non-anchor keypoints of a given keypoint in increasing clockwise orientation in order to provide a consistent sequence of quantized area ratios between the target and query images. For each fingerprint, the Sort in Clockwise Order module uses the current keypoint and Na closest anchor keypoints to calculate a subgroup center of origin. The non-anchor keypoints are not used in the calculation of a subgroup center of origin, in order to ensure that the origin will remain stable even in case of some extra or missing non-anchor keypoints.

Figure 10:
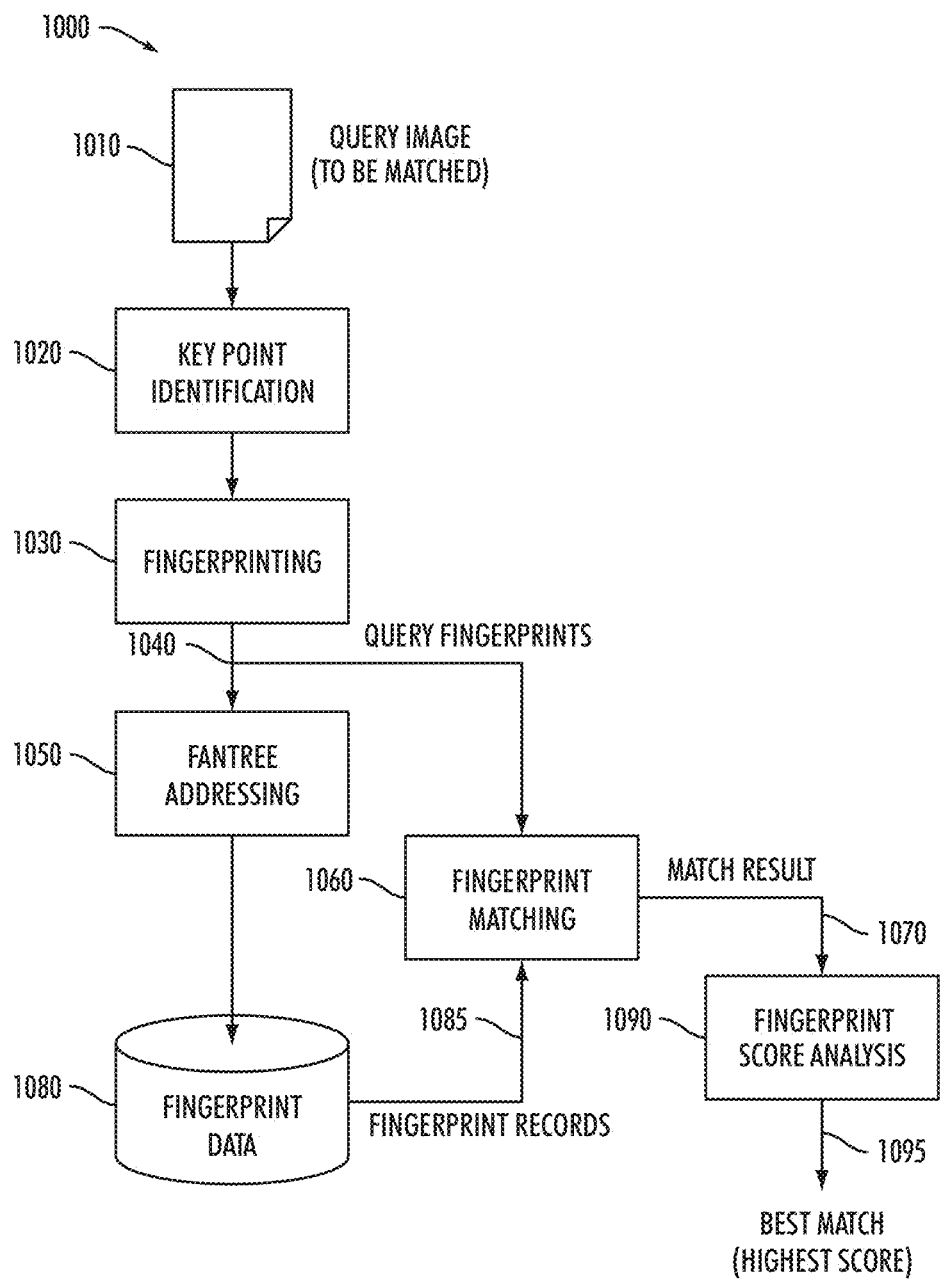
FIG. 10 illustrates a query search for finding document content of rich documents.

By classifying and separating the different objects into distinct image layers, specific fingerprinting techniques, more suitable for a particular object type is then used for the fingerprinting process of that object class. For instance a fingerprinting process which is designed to determine photo (i.e., picture) objects can now be used to fingerprint the material in the photo layer, while a distinct fingerprinting process is used to generate fingerprints for the objects in the text layer. This ability improves the accuracy of the fingerprinting process and in turn the document searching and matching processes such as shown in FIG. 10. The process of FIG. 10 is understood to be using fingerprints which have been classified in accordance to the teaching above.

At query time, FIG. 10 illustrates performing a real-time image query 1000 for a particular query image 1010, by identifying keypoint locations 1020 in the particular query image 1010 and computing fingerprint information 1030 for each query keypoint from local groups of query keypoints, looking up and matching the query fingerprints 1040 in the existing Fan Tree fingerprint data 1080 to determine the best matching document or set of documents within the collection. Each query fingerprint is used to calculate a Fan Tree address 1050, which leads to a particular Fan Tree Leaf node list, containing a subset of the original document collection fingerprint records 1085. Each original fingerprint from the subset list is in turn sequentially compared with the current query for fingerprint matching 1060. Each time the query fingerprint matches one of the retrieved fingerprint records, a count of the number of matching fingerprints for that document is incremented. In addition, a score is assigned to each fingerprint match based on the fingerprint strength and how uniquely it correlates with the target fingerprints. Finally, a Fingerprint score analysis module 1090 examines the resulting list of accumulated scores and counts of matching fingerprints 1070 for each document to determine the best matching document or set of documents 1095 within the collection that best matches the query image 1010. An overall score is calculated for each matching document by combining the number of fingerprint matches and their relative scores. Depending on the application, the Fingerprint score analysis module 1090; may select a single document with the highest overall score, or it may alternatively select all documents having an overall score higher than a given value. The matching document set can then be retrieved and printed out, electronically transmitted, displayed and/or stored, by one of the components of FIG. 4.

The described method and system is particularly suitable for finding similar presentation slides and other rich content material in a large collection using visual fingerprints. Due to the classification and separation of image content by category type, the resulting fingerprints are likely to be found even when an object such as a photo image, a line-art graphics, and/or a text object is slightly moved relative to other objects.

The present method and system enables a user to quickly and effectively locate and retrieve similar content in a large document collection containing rich content documents such as presentations and page layout documents.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of detecting document image content, the method comprising:
   separating a document image page into a plurality of image layers, each of the image layers having distinct characteristics from other ones of the image layers each corresponding to distinct category types;
   generating two dimensional visual fingerprints of the plurality of image layers, wherein distinct two dimensional visual fingerprinting techniques are used for each of corresponding ones of the distinct image layers;
   labeling and storing the formed two-dimensional visual fingerprints of the image layers by the category types;
   repeating the separating of the document image page, generating the two dimensional visual fingerprints, and labeling and storing the two dimensional visual fingerprints for a plurality of document image pages; and
   detecting image content between a query document image page and the plurality of document image pages, using the labeled two dimensional visual fingerprints, wherein the method is performed by use of at least an electronic processor.

2. The method according to claim 1 wherein the detecting image content includes:
   separating the query document image page into a plurality of query image layers, each of the query image layers having distinct characteristics from other ones of the query image layers;
   generating two dimensional visual fingerprints of the plurality of query image layers, wherein distinct two dimensional visual fingerprinting techniques are used for each of corresponding ones of the distinct query image layers;
   comparing the two dimensional visual fingerprints of the plurality of query image layers to the two-dimensional visual fingerprints of the plurality of image layers by layer category type; and
   determining the content of at least one of the plurality of document image pages and the query image page.

3. The method according to claim 2 wherein the generating of the two-dimensional visual fingerprints for each of the plurality of image layers for each of the document image pages is achieved independent of the other image layers of the same document image page.

4. The method according to claim 2 wherein the two dimensional visual fingerprints are labeled as being associated with one of the plurality of image layers.

5. The method according to claim 2 wherein at least one of the two dimensional visual fingerprints is labeled as being associated with more than one of the plurality of image layers.

6. The method according to claim 2 wherein the generating of the two-dimensional visual fingerprints of each of the plurality of query image layers of the document query image page is achieved independent of the other query image layers.

7. The method according to claim 2 wherein the determining includes:
   generating lists of document image pages whose two dimensional visual fingerprints match, to some extent, the two dimensional visual fingerprints of the query document image page;
   merging the lists of matching document image pages together to form a single list based on at least one of a weighted confidence and page similarity level; and
   identifying a best matching document image page to the query document image page, wherein the best matching document image page is the document image page with the largest overall weighted two dimensional visual fingerprints confidence or page similarity level across the plurality of image layers.

8. The method according to claim 2 wherein the image layers and the query image layers include, a text image layer, a line-art image layer, and a photo image layer.

9. The method according to claim 2 wherein weights of each of the image layers are adjusted to increase or decrease relative importance of a particular object category of the image layers in the overall matching.

10. The method according to claim 2 wherein the plurality of image layers are formed by sliding a local image window across the document image pages and the query document image page from left to right and top to bottom to cover the entire input image area, and repeating the above process at each window position.

11. The method according to claim 2 wherein different types of query fingerprints are only compared with two dimensional visual fingerprints of the two dimensional visual same type from the fingerprints of the document image pages, wherein by separating the different types of two dimensional visual fingerprints into independent image layers the resulting two dimensional visual fingerprints remain true to category type and prevent local mixing of different object types including text, line-art, and photo images.

12. The method according to claim 2 wherein the comparing includes:
   examining image properties of the pixels of the image in a local image window centered at a current pixel of interest by:
   analyzing with a color measure detector color distribution of the pixels in the local window, to determine the number and modality of colors, analyzing with a second contrast measure detector normalized contrast and edge sharpness for edge pixels within the local window, and analyzing with a third texture measure detector normalized texture response for the pixels within the local window.

13. The method according to claim 12 wherein a decision lookup table combines the detector outputs and produces a distinct output label for each image pixel, classifying the output as text, line-art, or photo image based on local image properties.

14. The method according to claim 2 wherein the separating includes determining local properties and wherein two narrowly concentrated colors indicate text-like properties, a set of more than two distinct colors indicate line-art properties, and a range of smoothly varying colors is indicative of photo images.

15. The method according to claim 2 wherein the separating includes determining local properties and edge pixels are classified as neighboring pixels whose difference in luminance exceeds a certain threshold, the value of the threshold dynamically computed from local window content.

16. The method according to claim 2 wherein the separating includes determining local properties and high contrast and sharp edges indicate text-like properties, while low pixel-to-pixel contrast is indicative of natural photo images.

17. The method according to claim 2 wherein the separating includes determining local properties and a texture response is defined as the number of particular peaks found in overlapping 3×3 window positions inside the local window, wherein a peak indicates a center pixel of a 3×3 window that is either larger or smaller, by a specified threshold, than any of its eight immediate nearest neighbors, in any horizontal vertical or diagonal direction, and wherein the number of such peaks is proportional to the frequency in the local window.

18. The method according to claim 17 wherein the texture response is used in discriminating at least halftone objects that may have been dithered in advance to create an illusion of simulated colors from a small subset of primary colors including cyan, magenta, yellow and black as is traditionally done for printing.

19. A method of classifying pixels of an image, fingerprinting the image, and using the fingerprints of the image for content detection, the method comprising:

defining a local image window;

examining image properties of the pixels of the image in the local image window centered at a current pixel of interest by:
(i) analyzing with a color measure detector color distribution of the pixels in the local window, to determine the number and modality of colors,
(ii) analyzing with a second contrast measure detector normalized contrast and edge sharpness for edge pixels within the local window, and
(iii) analyzing with a third texture measure detector normalized texture response for the pixels within the local window;

labeling and storing pixels outputted from the detectors as at least one of a text pixel, a line art pixel and a photo image pixel in a decision lookup table;

copying content of the pixels to one or more of a text image layer, line-art image layer and photo image layer in accordance with the labels applied to the pixels;

forming two-dimensional visual fingerprints of the text image layer, the line-art image layer and the photo image layer, the forming of the two-dimensional visual fingerprints of each of the image layers achieved independently of the other image layers;

storing the formed two-dimensional visual fingerprints of each of the image output layers; and comparing the stored two-dimensional visual fingerprints to determine content of a query document image page that matches the stored two-dimensional visual fingerprints, wherein the method is performed by use of at least an electronic processor.

20. The method according to claim 19 wherein the comparing includes comparing query fingerprints to the document image page fingerprints, and different types of query fingerprints are only compared with fingerprints of the same type from the document image pages, wherein by separating the text, line-art, and photo information into independent image layers the resulting visual fingerprints remain true to category type and prevent local mixing of different object types including text, line-art, and photo images.

21. A system of detecting document image content, the system comprising:

an electronic processor configured to:
separate a document image page into a plurality of image layers, each of the image layers having distinct characteristics from other ones of the image layers;
generate two dimensional visual fingerprints of the plurality of image layers, wherein distinct two dimensional visual fingerprinting techniques are used for each of corresponding ones of the distinct image layers;
store the formed two-dimensional visual fingerprints of the image layers;
repeat the separation of the document image page, generation of the two dimensional visual fingerprints, and store the two dimensional fingerprints for a plurality of document image pages;
select a query document image page;
separate the query document image page into a plurality of query image layers, each of the image layers having distinct characteristics from other ones of the image layers;
generate two dimensional visual fingerprints of the plurality of query image layers, wherein distinct two dimensional fingerprinting techniques are used for each of corresponding ones of the distinct image layers;
compare the two dimensional visual fingerprints of the plurality of query image layers to the two-dimensional visual fingerprints of the plurality of image layers; and
determine content of at least one of the plurality of document image pages and the query image page.

22. The method according to claim 1 wherein each pixel of a plurality of pixels of the document image pages is individually classified as being of at least one of a plurality of different image types and is individually stored in accordance with the classification.

23. The method of claim 1 wherein the storing of the labeled two dimensional visual fingerprints includes storing the labeled two dimensional visual fingerprints in a same single fingerprint database.

24. The method of claim 1, wherein the detecting step includes identifying a particular document image page that has a best matching score to the query document image page from among the plurality of document image pages, wherein the particular best matching document image page is identified by achieving a best matching score determined by combining a total number of two dimensional visual fingerprint matches across all the category types, and wherein each matching two dimensional visual fingerprint across all the category types individually contribute to the overall matching score.

25. The method according to claim 24, wherein the category types include at least text images and photo images.

\* \* \* \* \*